(12) United States Patent
McDougal et al.

(10) Patent No.: US 8,839,434 B2
(45) Date of Patent: Sep. 16, 2014

(54) MULTI-NODAL MALWARE ANALYSIS

(75) Inventors: Monty D. McDougal, St. Paul, TX (US);
William E. Sterns, Wylie, TX (US);
Randy S. Jennings, Plano, TX (US);
Jesse J. Lee, Allen, TX (US); Darin J. DeRita, Coppell, TX (US)

(73) Assignee: Raytheon Company, Waltham, MA (US)

( * ) Notice: Subject to any disclaimer, the term of this patent is extended or adjusted under 35 U.S.C. 154(b) by 269 days.

(21) Appl. No.: 13/087,447

(22) Filed: Apr. 15, 2011

(65) Prior Publication Data
US 2012/0266245 A1    Oct. 18, 2012

(51) Int. Cl.
*G06F 21/56*    (2013.01)

(52) U.S. Cl.
CPC ................. *G06F 21/567* (2013.01)
USPC ......... 726/24; 726/1; 726/22; 726/23; 726/25

(58) Field of Classification Search
None
See application file for complete search history.

(56) References Cited

U.S. PATENT DOCUMENTS

| 7,640,589 | B1 * | 12/2009 | Mashevsky et al. ............ 726/24 |
| 8,065,179 | B1 | 11/2011 | Karnik |
| 8,286,241 | B1 * | 10/2012 | Yeo et al. .......................... 726/22 |
| 2003/0023866 | A1 | 1/2003 | Hinchliffe et al. |
| 2004/0073810 | A1 * | 4/2004 | Dettinger et al. ............. 713/201 |
| 2005/0132184 | A1 | 6/2005 | Palliyil et al. |
| 2006/0230452 | A1 * | 10/2006 | Field ............................... 726/22 |
| 2007/0028291 | A1 * | 2/2007 | Brennan et al. ................... 726/1 |
| 2007/0150957 | A1 | 6/2007 | Hartrell et al. |
| 2007/0162975 | A1 * | 7/2007 | Overton et al. .................. 726/24 |
| 2008/0109871 | A1 * | 5/2008 | Jacobs ............................... 726/1 |
| 2009/0083852 | A1 * | 3/2009 | Kuo et al. .......................... 726/22 |
| 2009/0138573 | A1 * | 5/2009 | Campbell et al. ............. 709/218 |
| 2010/0077481 | A1 | 3/2010 | Polyakov et al. |
| 2010/0114714 | A1 | 5/2010 | Vitek |
| 2010/0169972 | A1 * | 7/2010 | Kuo et al. ........................ 726/23 |
| 2010/0192222 | A1 | 7/2010 | Stokes et al. |
| 2010/0281248 | A1 | 11/2010 | Lockhart et al. |
| 2011/0047620 | A1 | 2/2011 | Mahaffey et al. |
| 2012/0330863 | A1 | 12/2012 | Mcdougal et al. |

OTHER PUBLICATIONS

McDougal et al., "System and Method for Sharing Malware Analysis Results," U.S. Appl. No. 13/169,503, filed Jun. 27, 2011, 33 pages (1390).

(Continued)

*Primary Examiner* — Jung Kim
*Assistant Examiner* — Adrian Stoica
(74) *Attorney, Agent, or Firm* — Schwegman Lundberg & Woessner, P.A.

(57) ABSTRACT

A computer-implemented method includes accessing, by an analysis console, information related to a first file received at a first host of a plurality of hosts. Each host is capable of running a corresponding set of malware detection processes. The information includes: an identifier of the first file; and data indicating a first result of the first host applying the set of malware detection processes to the first file. The identifier is generated by the first host and is usable by each of the hosts to determine whether a second file comprises content substantially equivalent to content of the first file. The analysis console generates a first output including: the identifier of the first file; and a second result indicating whether the first file comprises malware. The second result is usable by each of the hosts to determine whether the second file comprises malware. The first output is propagated to the hosts.

26 Claims, 2 Drawing Sheets

(56) References Cited

OTHER PUBLICATIONS

McDougal et al., "Distributed Malware Detection," U.S. Appl. No. 13/169,574, filed Jun. 27, 2011, 32 pages (1391).

"U.S. Appl. No. 13/169,503, Final Office Action mailed Feb. 28, 2013", 15 pgs.

"U.S. Appl. No. 13/169,503, Non Final Office Action mailed Sep. 6, 2012", 16 pgs.

"U.S. Appl. No. 13/169,503, Response filed Dec. 6, 2012 to Non Final Office Action mailed Sep. 6, 2012", 14 pgs.

"System and Method for Sharing Malware Analysis Results", U.S. Appl. No. 13/169,503, (Jun. 27, 2011), 33 pgs.

"Trend Micro HouseCall", [Online] Retrieved From Internet: <http://web.archive.org/web/20100507053309/http://housecall.trendmicro.com/apac/?>, 2 pgs.

McDougal, et al., "Multi-Nodal Malware Analysis", U.S. Appl. No. 13/087,447, (Apr. 15, 2011), 35 pgs.

"U.S. Appl. No. 13/169,503 Response Filed Apr. 16, 2013 to Final Office Action mailed Feb. 28, 2013", 14 pgs.

"U.S. Appl. No. 13/169,503 Response Filed Jun. 28, 2013 to Final Office Action mailed Feb. 28, 2013", 15 pgs.

"U.S. Appl. No. 13/169,503, Advisory Action mailed May 7, 2013", 2 pgs.

"U.S. Appl. No. 13/169,503, Notice of Allowance mailed Sep. 13, 2013", 8 pgs.

"U.S. Appl. No. 13/169,503, Response filed Apr. 19, 2013 to Final Office Action mailed Mar, 28, 2013", 14 pgs.

* cited by examiner

US 8,839,434 B2

MULTI-NODAL MALWARE ANALYSIS

TECHNICAL FIELD

This disclosure relates generally to computer security and more particularly to multi-nodal malware analysis.

BACKGROUND

Malware (such as viruses, trojans, and other malicious software) has become increasingly difficult to protect against. Various methods have been used to combat malware, but more sophisticated malware continues to abound. Methods of detection have grown more complex but often these take longer to execute as a result of this complexity. Current, host-level malware protection systems search for files these systems can detect as being malware. However, malware protection limited to host systems is susceptible to numerous types of attacks. For example, zero-day attacks remain particularly problematic.

SUMMARY

In certain embodiments, a computer-implemented method includes accessing, by an analysis console, information related to a first file received at a first host of a plurality of hosts. Each host is capable of running a corresponding set of malware detection processes. The information includes: an identifier of the first file; and data indicating a first result of the first host applying the set of malware detection processes to the first file. The identifier is generated by the first host and is usable by each of the plurality of hosts to determine whether a second file comprises content substantially equivalent to content of the first file. The method further includes generating, by the analysis console, a first output comprising: the identifier of the first file; and a second result. The second result indicates whether the first file comprises malware. In addition, the second result is usable by each of the plurality of hosts to determine whether the second file comprises malware based on a determination that the second file comprises content substantially equivalent to content of the first file. The method also includes propagating the first output to the plurality of hosts.

Depending on the specific features implemented, particular embodiments may exhibit some, none, or all of the following technical advantages. In certain embodiments, multiple nodes of a system may operate cooperatively with each other to facilitate malware analysis. Particular systems may be operable to minimize inefficiencies associated with "false positive" malware detections. Various systems may be capable of minimizing the malware processing load at an analysis console. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION OF EXAMPLE EMBODIMENTS

Figure 1:
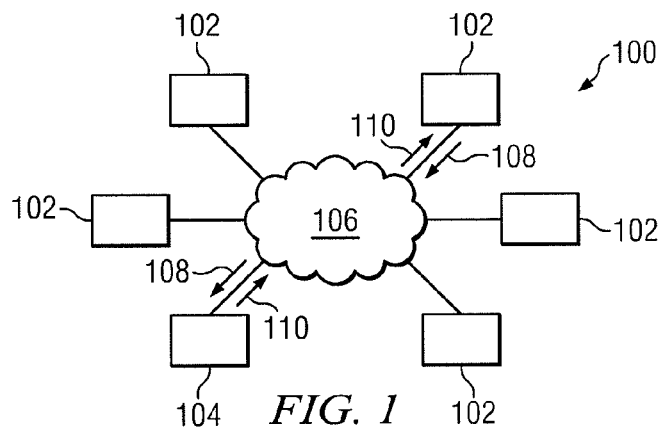
FIG. 1 is a block diagram illustrating one embodiment of a system for multi-nodal malware analysis.

FIG. 1 is a block diagram illustrating one embodiment of a system 100 for multi-nodal malware analysis. System 100 includes multiple malware detection nodes 102 communicatively coupled to an analysis console 104 through a network 106. As described further below, malware detection nodes 102 and analysis console 104 may operate cooperatively with each other to facilitate malware analysis. In certain embodiments, data arriving at system 100 may be subjected to a two-stage analysis. The first stage may be implemented, for example, at the detection node 102 receiving the data. The second stage may be implemented, for example, at analysis console 104. The results of the two-stage malware analysis may be propagated to all malware detection nodes 102. In this manner, each malware detection node 102 may benefit from malware analysis results generated by other components of system 100. In addition, the processing load at analysis console 104 may be minimized by distributing initial stages of malware analysis among malware detection nodes 102.

In particular embodiments, malware detection nodes 102 and analysis console 104 may communicate with each other using network 106. In certain instances, communication between one malware detection node 102 and another malware detection node 102 and/or between malware detection nodes 102 and analysis console 104 may be indirect. For example, one or more of malware detection nodes 102 and/or analysis console 104 may be in a demilitarized zone (DMZ) that may limit direct communication to other components of system 100.

As described further below, each node 102 may be capable of providing data 108 to analysis console 104 through network 106. The data may include information regarding a file (or set of files), the results of malware analysis processed at the node 102, all or a portion of the file content, other information that may be used by analysis console 104 for malware analysis, or any suitable combination of the preceding. Analysis console 104 may be capable of communicating an output 110 that is returned to the same node 102. The output may indicate the result of a malware analysis processed at analysis console 104. In some instances, output 110 may be propagated to all, most, or a selected subset of malware detection nodes 102.

In various embodiments, malware detection nodes 102 and/or analysis console 104 may be implemented using any suitable combination of hardware, firmware, or software. Malware detection nodes 102 and/or analysis console 104 may be implemented on the same or different hardware in various suitable combinations. Further details regarding the implementation and/or operation of malware detection nodes 102 and analysis console 104 are described below with reference to FIGS. 1-4.

In certain instances, system 100 may identify a file as containing malware if it includes any of a variety of forms of hostile or intrusive computer-readable logic designed to infiltrate a computer system. Particular forms of malware may include computer viruses, worms, trojan horses, spyware, adware, crimeware, and other malicious and unwanted software. For purposes of this disclosure, a file may include one or more of the following in any suitable combination: (1) a data file; (2) a data record; (3) an email message; (4) an attachment to an email message; (5) a Uniform Resource Locator (URL) or other suitable address identifier; and (6) any other suitable target object for which malware detection may be appropriate. In some embodiments, the term file as used herein may refer to a collection of files. For example, a ZIP file or other archive or compressed file type may include multiple embedded files.

Malware detection nodes 102, in certain embodiments, are each operable to run a set of malware detection processes on files they access. Running the set of malware detections processes on a file accessed by a node 102 may, in certain instances, result in a detection of malware. Malware detection by a particular node 102 may conclusively indicate that the file or files in question are known to contain malware. Alternatively, malware detection by a particular node 102 may indicate that the file or files in question are suspected of malware, though such detection may not conclusively indicate that the file or files are known to contain malware. In certain embodiments, nodes 102 may generate information that is accessible by analysis console 104 for further malware analysis of one or more files suspected of malware. The information may correspond to one or more files subjected to a set of malware detection process run by the node 102.

Each malware detection node 102 may comprise one or more processing systems at one or more locations. As examples and not by way of limitation, malware detection node 102 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, another type of host, or a combination of two or more of these. Where appropriate, malware detection nodes 102 may include one or more computer systems; be unitary or distributed; span multiple locations; span multiple machines; or reside in a cloud, which may include one or more cloud components in one or more networks. Where appropriate, one or more malware detection nodes 102 may perform without substantial spatial or temporal limitation one or more steps of one or more methods described or illustrated herein. As an example and not by way of limitation, one or more malware detection nodes 102 may perform in real time or in batch mode one or more steps of one or more methods described or illustrated herein. One or more malware detection nodes 102 may perform at different times or at different locations one or more steps of one or more methods described or illustrated herein, where appropriate.

This disclosure contemplates malware detection nodes 102 having any suitable number of any suitable components in any suitable arrangement. In particular embodiments, each malware detection node 102 may include a variety of tangible components (e.g., one or more processors, memory, storage, an input/output (I/O) interface, a communication interface, a bus, etc.). One or more processors of particular malware detection nodes 102 may include hardware for executing instructions, such as those making up a computer program.

Analysis console 104, in various embodiments, is operable to facilitate malware analysis for files that have been identified by one or more nodes 102 as requiring further malware analysis. In certain embodiments, analysis console 104 may be operable to access information generated by nodes 102 and to facilitate the propagation of information to nodes 102. The information propagated to each node 102 may include malware analysis outputs generated by analysis console 104, such that each node 102 may benefit from the results of malware detections and analysis by other nodes 102 and/or analysis console 104. In addition, the information propagated to each node 102 may include one or more updates generated by analysis console 104. In certain instances, the nodes 102 may be operable to use these updates in implementing various malware detection processes.

Analysis console 104 may comprise one or more processing systems at one or more locations. As example and not by way of limitation, analysis console 104 may be an embedded computer system, an SOC, an SBC (e.g., a COM or SOM), a desktop computer system, a laptop or notebook computer system, an interactive kiosk, a mainframe, a mesh of computer systems, a mobile telephone, a PDA, a server, another type of host, or a combination of two or more of these. Where appropriate, analysis console 104 may include one or more computer systems; be unitary or distributed; span multiple locations; span multiple machines; or reside in a cloud, which may include one or more cloud components in one or more networks. Where appropriate, analysis console 104 may perform without substantial spatial or temporal limitation one or more steps of one or more methods described or illustrated herein. As an example and not by way of limitation, analysis console 104 may perform in real time or in batch mode one or more steps of one or more methods described or illustrated herein. Analysis console 104 may perform at different times or at different locations one or more steps of one or more methods described or illustrated herein, where appropriate.

This disclosure contemplates analysis console 104 having any suitable number of any suitable components in any suitable arrangement. In particular embodiments, analysis console 104 may include a variety of tangible components (e.g., one or more processors, memory, storage, an I/O interface, a communication interface, a bus, etc.). In particular embodiments, analysis console 104 may include one or more processors each having hardware for executing instructions, such as those making up a computer program. One example of the internal components that may be included in an analysis console 300 is described further below with reference to FIG. 3.

Network 106, in some embodiments, may be communicative platforms operable to exchange data or information. In various embodiments, network 106 may include one or more packet data networks offering communication interfaces or exchanges between components of system 100. Network 106 may be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In various embodiments, network 106 may include firewalls or other equipment or software that create security zones and/or secure networks such as DMZs. One or more of malware detection nodes 102 and/or analysis console 104 may be located in one more of such security zones and/or secure networks in some embodiments. For example, analysis console 104 may be in a DMZ that is separate from one or more nodes 102. As another example, one node 102 may be in a different security zone than another node 102.

In operation of an example embodiment of system 100, one of the malware detection nodes 102 may access a first file (or a set of files) and run a set of malware detection processes using the accessed first file (or files). One possible result of the malware detection processes may be a determination by the node 102 that the first file should be analyzed further for malware. In response to this determination, the node 102 may generate an identifier for the first file and then determine whether the identifier is included in either a stored set of identifiers of files known not to be malware or a stored set of identifiers of files known to be malware. If node 102 determines that the identifier of the first file is included in the stored set of identifiers of files known to be malware, node 102 may determine that the first file contains malware and respond in an appropriate manner.

If node 102 determines that the identifier of the first file is included in the stored set of identifiers of files known not to be malware, node 102 may determine that the first file does not contain malware and respond in an appropriate manner. If node 102 determines that the identifier of the first file is not included in either the stored set of identifiers of files known to be malware or the stored set of identifiers of files known not to be malware, node 102 may generate information related to the first file for use in a second stage of malware analysis to be processed at analysis console 104. That is, in certain instances, the processing performed by a particular node 102 may be considered the first stage of a multi-stage malware analysis; and the processing performed at analysis console 104 may be considered a second stage of the multi-stage malware analysis. As a result of the malware analysis processed at analysis console 104, an output may be generated by analysis console 104. The output may include, for example, an indication of whether the file is known to be malware. In addition, the output may include the identifier for the file. In certain embodiments, the output is propagated to each node 102, such that each node 102 may update a respective stored set of identifiers of files known to be malware or a respective stored set of identifiers known not to be malware, based on the indication of the output generated by analysis console 104 regarding whether the file is malware.

The operation described above illustrates one example of how nodes 102 and analysis console 104 may operate cooperatively with each other to facilitate malware analysis. In certain instances, system 100 may be operable to minimize inefficiencies associated with "false positive" malware detections by nodes 102. For example, a particular file might test positive for malware as a result of a set of malware detection processes run at a particular node 102, but then further analysis at analysis console 104 may result in a final adjudication that the file is known not to be malware. Because the results of the final adjudication may be propagate to each node 102, each node 102 may later process similar malware detections using this final adjudication, without necessarily requesting further analysis to be performed at analysis console 104. Such a scenario illustrates one way in which the processing load at analysis console 104 may be minimized.

In certain embodiments, system 100 may operate in a variety of modes. For example, system 100 may operable in a passive mode, an active mode, a hybrid pass/active mode, and/or in a variety of other modes. When operating in the passive mode, system 100 may not prevent the operation of processes while a file is being detected for malware.

When operating in an active mode, system 100 may delay one or more operations while the malware process is proceeding, depending on the context in which system 100 is operating. For example, if in the active mode, system 100 may prevent the delivery of an e-mail until an attachment to the e-mail has been analyzed for malware using at least one node 102 and/or analysis console 104. As another example, when system 100 is operating in an active mode in a context where files are being uploaded, system 100 may stop a file from being uploaded until the malware detection process applied to the file has been completed. Hence, in some embodiments, if a file was being uploaded to a database, the file would not be entered into the database and made available to other users or processes until the file has been analyzed by the malware detection scheme of system 100. If system 100 operates in a Web browsing context and is operating in the active mode, an Internet site may not be transmitted to a Web browser requesting the site until the site has been fully analyzed for malware by system 100.

Operation of system 100 in a hybrid mode may comprise aspects of both the passive and active modes. In one example hybrid mode, system 100 may operate in a hybrid mode for detection purposes. When a file is determined to be known malware, system 100 may switch to an active mode, preventing or delaying one or more operations while the malware process is proceeding, depending on the context in which system 100 is operating. As a particular example, when in the hybrid mode, system 100 may allow emails to be processed and delivered during the detection process; however, when an email is characterized as being suspected of malware, system 100 may prevent the email and/or its contents from being delivered in an active manner.

In particular embodiments, one or more malware detection nodes 102 and/or analysis console 104 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Figure 2:
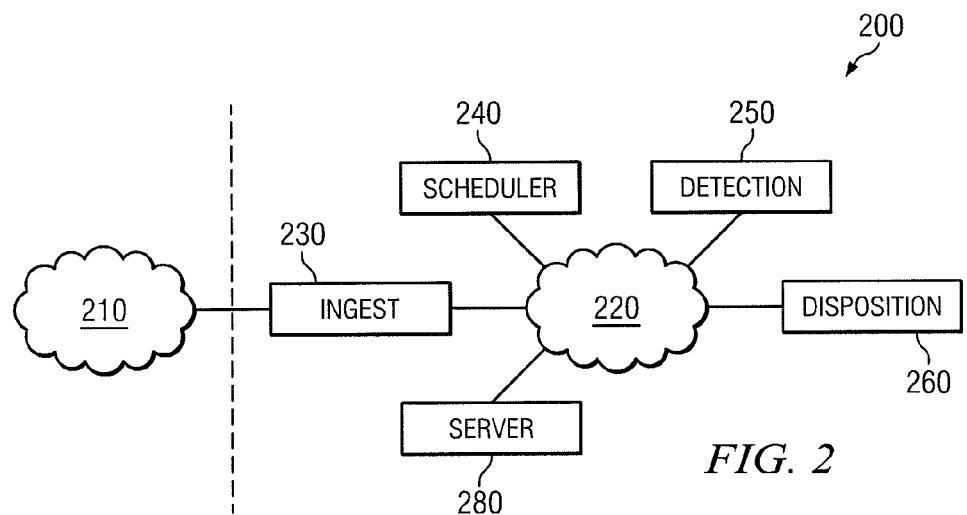
FIG. 2 illustrates one embodiment of a malware detection node suitable for implementing one or more portions of particular embodiments.

FIG. 2 illustrates one embodiment of a malware detection node 200. In certain embodiments, one or more nodes 102 of FIG. 1 may be substantially similar to malware detection node 200. However, the present disclosure contemplates one or more of malware detection nodes 102 of FIG. 1 being implemented differently than malware detection node 200. As shown in FIG. 2, malware detection node 200 includes an ingest block 240, a detection block 250, a disposition block 260, a server 280, and an internal network 220. Internal network 220, in certain embodiments, refers to any interconnecting system capable of transmitting audio, video, signals, data, messages, or any combination of the preceding between blocks 230-280. According to one embodiment, interconnecting system includes a system bus. Malware detection node 200 is in communication with an external network 210, which in certain embodiments may be substantially similar to network 106 of FIG. 1. In various embodiments, blocks 220-280 may represent hardware, software, or a combination of the two.

According to one embodiment, the implementation and/or operation of blocks 220-280 may be described generally as follows. Ingest block 230 accesses a file and determines that one or more tests that should be performed on the file in order to determine whether the file is suspected of malware. In response, detection block 250 performs the test(s) that were determined by ingest block 230 in accordance with scheduling performed by scheduler block 240. Disposition block 260 utilizes the results of the tests performed by detection block 250 to determine whether the file(s) should be sent to server block 280 for quarantine purposes while a second analytical stage for the file is processed (e.g., at analysis console 104). Further detail regarding the implementation and/or operation of blocks 220-280 are described below.

Ingest block 230 may be implemented using any suitable combination of hardware, firmware, or software. In certain instances, ingest block 230 may reside on the same hardware that blocks 240-280 reside upon or on different hardware. Ingest block 230 may be operable to extract and cause to be analyzed the files that are accessed by malware detection node 200. Ingest block 230 may analyze the file(s) and determine one or more tests that should be performed on the file(s) in order to determine whether the file is suspected of malware. In certain embodiments, ingest block 230 may be configured to determine the type of file that ingest block 230 receives. For example, ingest block 230 may examine an extension associated with the file name to determine the type of the file. As another example, ingest block 230 may examine portions of the file content in order to determine its type. Ingest block 230 may look at characters in a header of a file to determine its type. Such characters may be referred to as magic numbers or magic bits. In this manner, in some embodiments, ingest block 230 may detect the correct type of the file even if the extension of the file's name has been removed or changed. As another example, for certain types of files (e.g., MICROSOFT OFFICE files), ingest block 230 may determine the file type based on both magic number(s) and the file extension, possibly examining the magic number(s) prior to examining the file extension.

In various embodiments, ingest block 230 may be configured to determine whether a file has been previously analyzed for malware. Ingest block 230 may use one or more techniques to determine if a file has been previously analyzed for malware. For example, ingest block 230 may generate one or more hashes of content of the file (such as a checksum, an MD5 hash, and/or a SHA1 hash). These value(s) may be compared to a database containing hash values of previously analyzed files. If the hash value is found in data storage, ingest block 230 may determine that the file has been previously analyzed. If the hash value is not present in data storage, ingest block 230 may determine that the file has not been previously analyzed. In some embodiments, ingest block 230 may use the name of the file and/or its extension, as well as variations on those items, to determine if the file has been previously analyzed.

If it is determined that a file has been analyzed previously, malware detection schemes may not be applied to the file; instead, the results of the previous analysis of the file may be determined using a database that contains results of a previous analysis of the file. If the results indicate that the file is known not to be malware, then the analysis of the file may end. If it is determined that the file was previously determined to be malware, then it may be determined that the file should be quarantined. If it is determined that the file has been previously received and is currently being analyzed (e.g., possibly including review by human analysts), then action may be taken once the outcome of the ongoing analysis is known. In some embodiments, this may allow for more efficient utilization of the resources that perform the malware detection schemes on the files and may reduce the workload of a machine and/or human analyst.

In certain embodiments, ingest block 230 may be used to determine whether a file should undergo malware detection and/or which malware detection schemes should be applied. For example, ingest module 230 may determine that a file received by ingest module 210 is a plain text file. Ingest block 230 may then retrieve one or more policies associated with plain text files. A retrieved policy may indicate that plain text files are not to be analyzed for malware. As a result, the plain text file may be ignored. As another example, ingest block 230 may determine that a file is a document created by the MICROSOFT WORD application. Ingest block 230 may then retrieve one or more policies associated with MICROSOFT WORD documents. Ingest block 230 may examine the retrieved policy or policies and determine that the received file should be analyzed for malware. Ingest block 230 may also examine the retrieved policy or policies and determine the malware detection schemes that should be applied to the MICROSOFT WORD document. Ingest block 230 may then create and store entries in data storage consistent with the determined malware detection schemes.

Scheduler block 240, in various embodiments, may be implemented using software, hardware or a combination of the two. Scheduler Block 240 may reside on the same hardware as blocks 230 and/or 250-280 or it may reside on separate hardware. Scheduler block 240, in some embodiments, may determine the order in which malware detection processes are performed. Scheduler block 240 may assign processes to various computing resources of malware detection node 200 using any suitable method. For example, scheduler block 240 may use a first-in-first-out (FIFO) algorithm to assign processes. Processes may also be prioritized. For example, scheduler block 240 may use a FIFO approach to schedule jobs initially, but it may be determined to prioritize one job over another in response to results provided by the detection nodes. Schedule policies may be used by scheduler block 240 to determine how to schedule jobs and how to prioritize jobs. Priorities for jobs, in some embodiments, may also be determined based on the context associated with the file. For example, if the file undergoing analysis was part of an e-mail attachment, it may be prioritized higher than other files.

In some embodiments, policies used by scheduler block 240 may be modified when a new malware detection scheme is added. Information may be entered regarding how to apply the malware detection scheme. For example, such information may be entered using a tabbed interface, a wizard-style interface, or other interfaces for entering information. The information entered may include how jobs should be prioritized, the context associated with the file, which malware detection nodes 102 are involved in implementing the malware detection scheme, and/or other items associated with applying a malware detection scheme.

Detection block 250, in various embodiments, may be operable to perform the test(s) that were determined by ingest block 230 in accordance with scheduling performed by scheduler block 240. In certain embodiments, detection block 250 may conform to an interface standard for applying malware detection. Such an interface may include standards for one or more of the following: specifying the file (including, possibly, a URL) that is to be analyzed configuration parameters for applying the detection scheme, time limit for completing the analysis, format of results, specifying the reason for indicating that an analyzed item is suspect, providing log files, and other suitable items involved with applying malware detection schemes.

In some embodiments, having such an interface may be advantageous because it may allow policies to call for the application of malware detection schemes without having to give precise parameters based on the configuration of the detection node. In this manner, in various embodiments, new detection schemes may be added to the system without needing to recode various parts of the system since the detection node applying the new malware detection scheme would conform to the interface standard. For example, to add a new malware detection scheme, the detection node applying the new malware detection seem may be configured to conform to the interface standard by being configured to receive files for analysis in the same or similar manner as other configuration nodes applying other malware detection schemes. In addition, for example, the configuration node applying the new malware detection scheme may be configured to report the results of applying the new malware detection scheme in the same or similar manner as other configuration nodes applying other malware detection schemes. This, in some embodiments, may be advantageous in that it allows for the system to adapt to new malware detection schemes.

Detection block 250 may be implemented on a variety of types of hardware. For example, detection block 250 may be configured in a blade architecture or on physical hosts. Detection block 250 may also be configured utilizing clusters or other suitable distributed computing architectures. Detection block 250 may utilize virtualization and/or may include virtual machines. Detection block 250 may be used to apply a variety of malware detection schemes to a file (which, in some embodiments, may include one or more URLs). In some embodiments, detection block 250 may be specialized such that malware detection node 200 may be configured to apply a type of malware detection scheme. For example, detection block 250 may be configured to apply behavior-based malware detection schemes and/or metadata-based detection schemes when metadata of a file is analyzed. In yet another example, detection block 250 may be configured to apply signature-based detection schemes to files. As another example, detection block 250 may also apply classification-based detection schemes. As described above, detection block 250 may be configured to apply other forms of detection schemes that conform to an interface to facilitate the incorporation of new or different detection schemes.

Disposition block 260, in certain embodiments, may be operable to utilize the results of the tests performed by detection block 250 to determine what should be done with the file(s). In some cases, disposition block 260 may characterize the file as being suspected of malware. In response, malware detection node 200 may send information corresponding to the file(s) and/or actual content of the file(s) for further review at analysis console 104. In various embodiments, disposition block 260 may respond to the results of detection block 250 regardless of whether it sends the file(s) to analysis console 104. For example, disposition block 260 may determine that the file(s) should be quarantined and send the file to server block 280 to quarantine the file. In some embodiments, disposition block 260 may also determine that the file(s) are not malware and may perform suitable corresponding actions. For example, disposition block 260 may release for delivery a message to which the analyzed file(s) were attached, in response to the determination by disposition block 260 that the file(s) are not malware.

Server 280 may include, for example, a file server, a domain name server, a proxy server, a web server, a computer workstation, or any other tangible device and associated logic operable to communicate with blocks 230, 240, 250, 260, and/or 280 through network 220. Server 280 may execute with any of the well-known MS-DOS, PC-DOS, OS-2, MAC-OS, WINDOWS™, UNIX, or other appropriate operating systems, including future operating systems. In certain embodiments, server 280 may include one or more of the following in any suitable combination: a processor, data storage, a network interface, input functionality, and output functionality.

Figure 3:
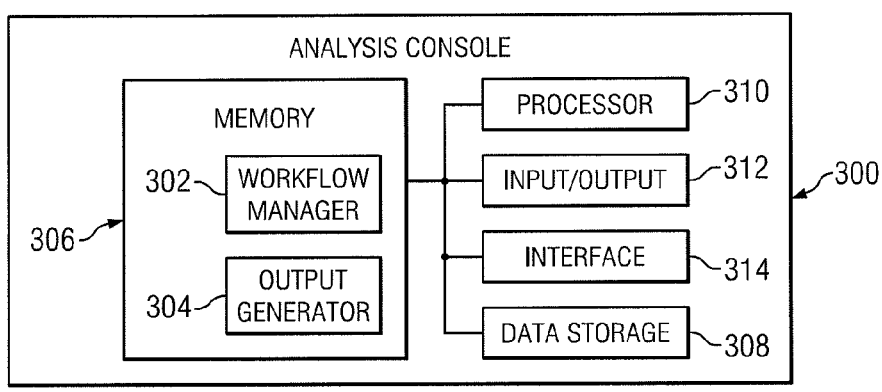
FIG. 3 illustrates one embodiment of an analysis console suitable for implementing one or more portions of particular embodiments.

FIG. 3 illustrates one embodiment of an analysis console 300. In certain embodiments, analysis console 300 may be substantially similar to analysis console 104 of FIG. 1. As shown in FIG. 3, analysis console 300 includes a workflow manager 302 and an output generator 304 stored in computer-readable memory 306, data storage 308, processor 310, input/output functionality 312, and an interface 314. Workflow manager 302, output generator 304, memory 306, data storage 308, processor 310, input/output functionality 312, and interface 314 may be implemented using any suitable respective combination of hardware, firmware, or software. In certain embodiments, workflow manager 302, output generator 304, memory 306, data storage 308, processor 310, input/output functionality 312, and/or interface 314 may be capable of executing logic accessible to these components and/or stored therein. Although this embodiment includes workflow manager 302, output generator 304, memory 306, data storage 308, processor 310, input/output functionality 312, and interface 314, other embodiments may exclude one or more of these components without departing from the scope of the present disclosure.

In some embodiments, workflow manager 302 may determine a workflow. A workflow is an ordered list of tasks related to malware analysis. Execution of a workflow starts with the task in the list. Upon completion of a task, the active task calls the subsequent task in the ordered list using, for example, a defined API. When the final task of the workflow finishes, the workflow is complete. Certain workflows may facilitate malware analysis by a human analyst and/or by various analysis modules of analysis console 300. The information analyzed may correspond to a file and/or may include actual content of the file.

In certain instances, a file or information corresponding to the file may be presented to a human analyst for review based on a prior characterization of the file. For example, if malware detection node 200 characterizes the file as being suspected of malware then a human analyst may review the file to determine if it is in fact malware. As another example, if the file is determined to be malware rather than merely to be suspected malware, a human analyst may review the file in order to learn more about the malware in the file and/or to start an incident response review (e.g., to clean up the file). In such and other scenarios, workflow manager 302 may determine a workflow associated with reviewing the file. In some embodiments, workflow manager 302 may generate a set of tasks to be performed by a human analyst reviewing the file based on a variety of factors. Such factors could include the type of file being reviewed and the characterization of the file by malware detection node 200. Other factors may include whether the system is operating in a passive, active, a hybrid passive/active mode, or another mode. For example, if operating in an active mode, a determination that the file is suspected malware may invoke an advanced malware analysis workflow to be followed by a human analyst. As another example, if the file is determined to be known malware, then workflows associated with cleaning up the environment(s) the file has been in as well as other incident response workflows (e.g., notifying a user or an administrator) may be determined. Other suitable workflows may be generated based on these or other suitable factors.

In various embodiments, workflow manager 302 may, automatically perform certain tasks to facilitate the review of the file by the human analyst. For example, it may be determined that in order for a file to be properly reviewed by a human analyst, all strings in the file should be extracted. Workflow manager 302 may automate this extraction procedure. Workflow manager 302 may also provide a priority associated with the review of the file. For example, if it is determined that a file has a higher probability of containing malware, then a higher priority may be assigned to the review of the file. Workflow manager 302 may also provide a display that enables the human analyst to review the workflow, the file being analyzed, and/or information pertaining to that file.

Output generator 304, in certain embodiments, may be operable to generate a malware analysis output. In various embodiments, the output may include an identifier of the file or files analyzed. For example, an identifier might include a hash of all or a portion of a file analyzed at analysis console 300. The hash may be at least substantially equivalent to a hash generated by the ingest block 230 of the node 200 requesting the file to be further analyzed for malware. Certain outputs generated by output generator 304 may include an indication of whether the file (or files) analyzed at output generator 304 contain malware.

According to one embodiment, the output generated by output generator 304 may be propagated to each malware detection node 102. Each malware detection node 102 may be configured to use the output to determine whether all or a portion of another file accessed by node 102 comprises content substantially equivalent to content of a file previously analyzed by the node 102 or another component of system 100. For example, the output may be used to determine whether content of newly accessed file is at least 95% equivalent to content of a previously analyzed file. Although a 95% equivalency value is used in this example, other equivalency thresholds may be used in comparing content of files (e.g., equivalency thresholds of 90%, 98%, 99%, 99.99%, 100%, etc.)

Malware detection nodes 102 may each be operable to generate hashes of files they access and determine whether the hashes are equivalent or substantially equivalent to hashes received as outputs from output generator 304. If the hash matches the hash of a file previously determined to contain malware, the node 102 accessing the file may determine that the accessed file contains malware. However, if the hash matches the hash of a file previously determined not to contain malware, node 102 accessing the file may determine that the accessed file does not contain malware.

Memory 306 and data storage 308 may each comprise any number of tangible storage media. Additionally, all or part of memory 306 and/or data storage 308 could reside locally within analysis console 300 or could reside at a location external but accessible to analysis console 300 (e.g., within removable media, and/or at an external database).

Processor 310 may refer, for example, to the one or more tangible devices of analysis console 300 capable of carrying out instructions, such as that of a computer program. In certain embodiments, processor 310 may comprise the primary element or elements executing or realizing various logic-based functions, including, for example, the functions of workflow manager 302 and an output generator 304.

I/O functionality 312 may comprise, for example, any communication method of analysis console 300 (e.g., from an image buffer to a display). In some embodiments, input functionality may comprise, for example, the receiving signals or data by analysis console 300. In other embodiments, output functionality may comprise, for example, the communication of signals or data by analysis console. These terms may also refer to part of an action, such as, for example, to "perform I/O" may involve performing an input and/or output operation. In some cases, one or more communication devices of analysis console 300 may be used to implement both input and output functionality.

Interface 314 may comprise, for example, any tangible device(s) that may be used (e.g., by a person, or by another device or system) to communicate with analysis console 300. For example, keyboards and mice may be considered input interfaces 314 of some analysis consoles 300, while monitors and printers may be considered output interfaces of some analysis consoles 300.

In certain embodiments, the described processing and memory elements (such as memory 306 and processors 310) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, analysis console 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Figure 4:
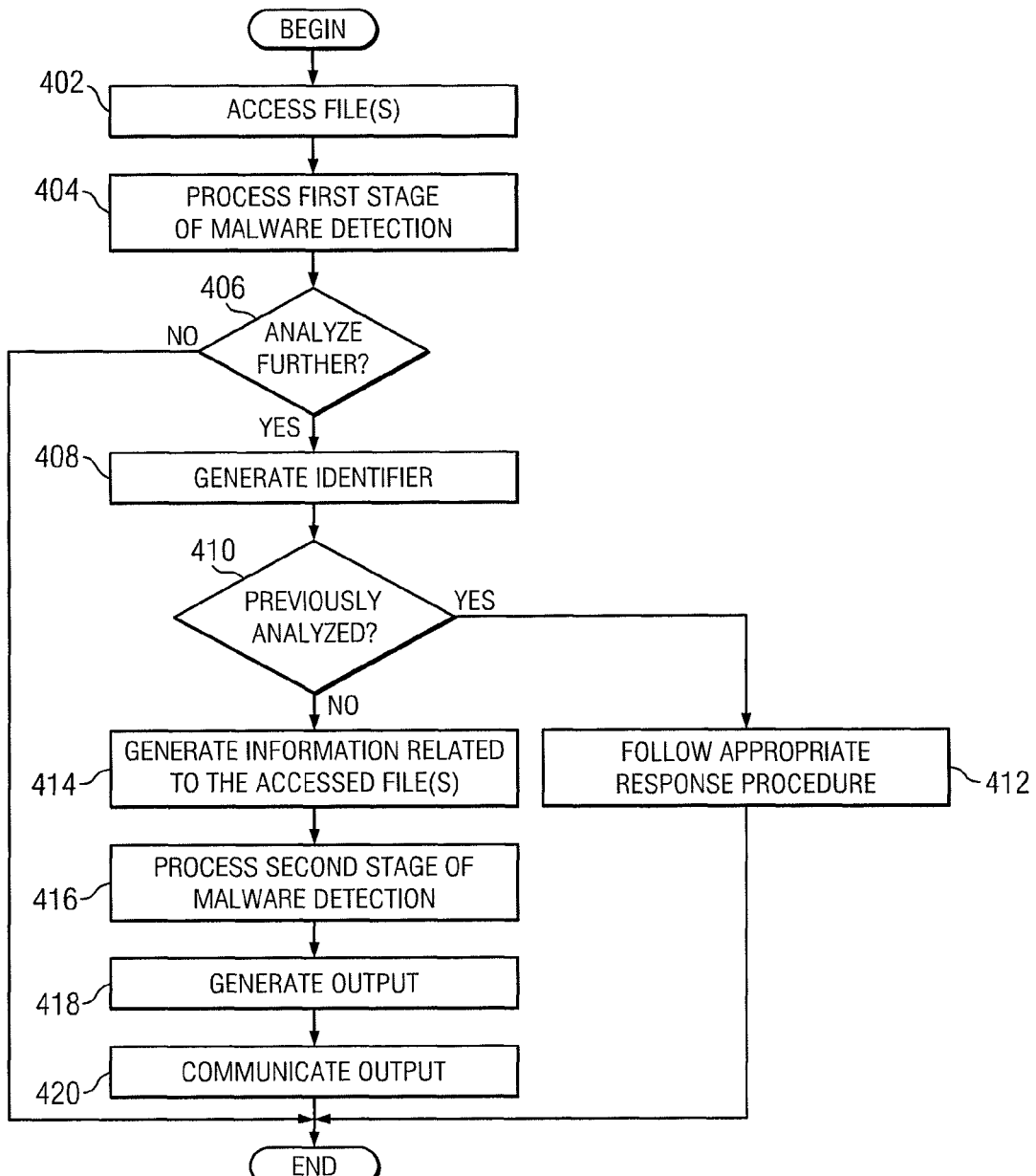
FIG. 4 is a flowchart illustrating one embodiment of processing files in a malware detection system.

FIG. 4 is a flowchart illustrating an example method of multi-nodal malware analysis. In step 402, a file or collection of files is accessed for malware analysis. Certain embodiments may be capable of accessing files in a variety of contexts. For example, aspects of system 100 may be used to detect malware in a messaging environment. Suitable messaging environments include, but are not limited to, an e-mail environment, an instant messaging environment, a peer-to-peer messaging environment, a chat environment, or other messaging environments. As another example, files may be accessed in contexts where files are downloaded and/or uploaded. For example, some or all of system 100 may be utilized in File Transfer Protocol (FTP) sessions, Wiki sessions, online message boards (such as forums), or other interactive environments. In other example, files may be accessed in Web browsing context. In such a context, some or all of system 100 may analyze requested Web pages and determine if they are malicious. In a Web browsing context, accessing a "file" may comprise accessing one or more URLs.

Step 402, in certain embodiments, may include accessing a file or a collection of files by ingest block 230 of malware detection node 200. In an email context, for example, ingest block 230 may be configured as a Mail Transfer Agent (MTA) that is able to handle e-mail messages. Configured in this manner, ingest block 230 may analyze a message, one or more attachments to the message, or both the message and any attachment(s) to the message. When some or all of system 100 operates in a context where files are uploaded, such as in an FTP session, ingest block 230 may be configured to access the file(s) associated with the FTP session and perform analysis on the file(s). When aspects of system 100 are used in a Web browsing context, ingest block 230 may be configured to retrieve an address associated with an Internet site or files associated with the Internet site and analyze such items. In certain embodiments, ingest block 230 may be operable to access files from network 106 and/or from a network external to network 106.

Step 404, in certain embodiments, may include running a first stage of malware detection for each accessed file. In step 406, a determination is made for each accessed file regarding whether the file should be analyzed further for malware. Steps 404 and/or 406, in certain embodiments, may include use of ingest block 230 to determine whether a file should undergo malware detection and/or to determine which malware detection schemes should be applied. As described previously, detection block 250, in various embodiments, may be operable to perform the test(s) that were determined by ingest block 230 in accordance with scheduling performed by scheduler block 240.

If it is determined that the file should be analyzed further for malware, then an identifier for the file may be generated in step 408. According to one embodiment, the identifier may be generated at least in part by performing a hash on all or a portion of the file. For example, ingest block 230 may generate one or more hashes of the file (such as a checksum, an MD5 hash, and/or a SHA1 hash). In certain embodiments, the identifier may be usable by each node 200 to determine whether another file comprises content substantially equivalent to content of the identified file.

In step 410, each accessed file may be analyzed to determine if it has been previously analyzed by the malware detection system. If it is determined that a file has been analyzed previously, malware detection schemes may not be applied to the file; instead, the results of the previous analysis of the file may be determined using one or more databases that contain results of a previous analysis of the file. For example, the identifier generated in step 408 may be compared to a set of identifiers of files known to contain malware and/or to a set of identifiers known to free of malware to see if there is a match. If the identifier is in the set of identifiers known to contain malware, then a response procedure for known malware detection may be followed in step 412. Alternatively, if it is determined that the identifier is in the set of identifiers known not to be malware, then a response procedure for a file known not to contain malware may be followed in step 412. However, if it is determined that the identifier is not in either the set of identifiers known to contain malware or in the set of identifiers known to be free of malware, then the system may determine that the file has not been previously analyzed and, as a result, the system may proceed to step 414.

In step 414, information may be generated related to the file. The information may include, for example, a name of the file, content of the file, metadata of the file, data indicating a result of the first stage of malware detection processes executed in step 404, a count indicating the number of times the suspected content has been identified, any combination of the preceding, and/or other information that may be used in a second stage of analysis to determine whether or not the file contains malware.

In certain embodiments, all or a portion of the information generated in step 414 may be sent to other malware detection nodes 200. Those other nodes 200 may use this information to identify other files received at those nodes 200 that may also be suspected of containing malware. For example, those other files may have the same or substantially the same identifier, name, content, metadata, etc. as the file accessed in step 402 and determined to be suspected of malware in step 406. In those instances where files received at other nodes 200 are identified as being related to the file accessed in step 402 and determined to be suspected of malware in step 406, those files received at other nodes 200 may be placed in quarantine until the file accessed in step 402 has been fully analyzed, thereby avoiding what may otherwise have been redundant malware analysis.

In step 416, a second stage of malware analysis is performed using the information generated in step 414. In certain embodiments, the information may be processed in whole or in part by workflow manager 302, as described previously. According to one embodiment, the information may be presented to a human analyst for review. The human analyst may review the information in order to learn more about the suspected malware in the file and/or to start an incident response review (e.g., to clean up the file). In certain instances, a human analyst may determine that the most appropriate malware detection review of the file may include both the information corresponding to the file (generated in step 414) and the file itself. Accordingly, the human reviewer may request all or a portion of the actual file from the particular node 200 that conducted the first stage of analysis. In certain instances, the second stage of malware analysis processing may include incrementing a counter indicating a number of replicas of the file in question that have been received and identified by nodes 200 as being suspected of malware.

In step 418, an output may be generated. In certain embodiments, the output may include the identifier of the file or files analyzed and an indication of whether each file analyzed is known to contain malware or is known to be free of malware. Various outputs may be usable by each node 200 to determine whether a newly received file received at the node 200 contains malware based, for example, on a determination that the newly received file comprises content substantially equivalent to content of the file previously analyzed. In particular embodiments, the output may be generated by output generator 304, as described previously.

In step 420, the output is communicated. For example, the output may be propagated to each node 200, such that each node 200 may update a respective set of identifiers of files known to be malware or a respective set of identifiers known not to be malware, based on the indication of the output generated in step 218 regarding whether the file is malware.

Throughout this disclosure, reference to a computer-readable storage medium may include, as examples and not by way of limitation, any suitable combination of a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:
1. A computer-implemented method, comprising:
   accessing, by an analysis console, information related to a first file received at a first host of a plurality of hosts, each host running a corresponding set of malware detection processes, the information comprising:
   an identifier of the first file, the identifier generated by the first host, the identifier usable by each of the plurality of hosts to determine whether a second file comprises content substantially equivalent to content of the first file;
a time limit for completing a further malware analysis;
data indicating a first result of the first host applying the set of malware detection processes to the first file, the first result being inconclusive as to whether the first file contains malware; and
a reason indicating why the first file is suspected of containing malware;
performing, by the analysis console within the time limit, the further malware analysis of the first file based at least in part on the first result;
generating, by the analysis console, a first output based at least in part on the first result, the first output comprising:
the identifier of the first file;
a second result indicating conclusively whether the first file comprises malware based on the further malware analysis, the second result usable by each of the plurality of hosts to determine whether the second file comprises malware based on a determination that the second file comprises content substantially equivalent to content of the first file; and
propagating the first output to the plurality of hosts.

2. The method of claim 1, wherein:
the second result of the first output propagated to the plurality of hosts indicates that the first file is not malware; and
the second result is usable by each of the plurality of hosts to determine that the second file does not comprise malware based at least in part on the determination that the second file comprises content substantially equivalent to content of the first file.

3. The method of claim 1, wherein:
the second result of the first output propagated to the plurality of hosts indicates that the first file is malware; and
the second result is usable by each of the plurality of hosts to determine that the second file comprises malware based at least in part on the determination that the second file comprises content substantially equivalent to content of the first file.

4. The method of claim 1, wherein, in response to receiving the first output, one of the corresponding set of malware detection processes run at each of the plurality of hosts comprises determining whether the identifier of the first file matches an identifier of a second file.

5. The method of claim 1, wherein:
the identifier of the first file comprises a hash of at least a portion of the first file; and
the identifier is usable by each of the plurality of hosts to identify the second file by comparing the hash of at least the portion of the first file to a hash of at least a portion of the second file.

6. The method of claim 1, further comprising:
accessing, by the analysis console, information related to a third file received at a second host of the plurality of hosts, the information related to the second file comprising:
an identifier of the third file, the identifier generated by the second host, the identifier usable by each of the plurality of hosts to determine whether a fourth file comprises content substantially equivalent to content of the third file;
data indicating a third result of the second host applying the set of malware detection processes to the third file;
generating, by the analysis console, a second output comprising:
the identifier of the third file;
a fourth result indicating whether the third file is malware, the fourth result usable by each of the plurality of hosts to determine whether the fourth file comprises malware based on a determination that the fourth file comprises content substantially equivalent to content of the third file; and
propagating the second output to the plurality of hosts.

7. The method of claim 1, further comprising propagating an update to a set of configuration parameters, the update usable by the first host to identify the second file comprising content substantially equivalent to content of the first file.

8. The method of claim 1, further comprising:
receiving, by the analysis console, a count from one of the plurality of hosts, the count indicating that the second file comprising content identical to the first file has been received and identified by the one of the plurality of hosts; and
incrementing, by the analysis console, a counter indicating a number of replicas of the second file that have been received and identified by the plurality of hosts.

9. The method of claim 1, further comprising:
sending, by the analysis console, a request for the first host to send content of the first file; and
accessing, by the analysis console in response to receiving the content of the first file, the content of the first file;
wherein performing the further malware analysis of the first file includes processing, by the analysis console, an analysis of the content of the first file for malware.

10. The method of claim 1, wherein the information related to the first file further comprises one or more of:
a hash of the first file;
a name of the first file;
content of the first file; and
metadata of the first file.

11. The method of claim 1, wherein the analysis console is remote from the first host.

12. The method of claim 1, wherein:
the set of the malware detection processes comprises a set of file types; and
the set of malware detection processes applied by the first host to the first file comprises determining whether a file type associated with the first file corresponds to a file type of the set of file types.

13. A computer-implemented method, comprising:
generating by a first host a first output of a malware analysis of a first file, the first output comprising:
a result of the malware analysis of the first file the result having an inconclusive indication of whether the first file comprises malware, the result including a reason indicating why the first file is suspected of containing malware;
a first identifier of the first file, the first identifier usable by the first host and a second host to determine whether a second file comprises content substantially equivalent to content of the first file; and
a time limit for completing a further malware analysis;
providing, by the first host, the first output of the malware analysis to an analysis console communicatively coupled to the first host and a second host;
receiving, from the analysis console, the further malware analysis of the first file performed by the analysis console, within the time limit, based at least in part on the first result, the further malware analysis indicating conclusively whether the first file comprises malware; and adding by the first host, in response to receiving the further malware analysis, the first identifier to either a set of identifiers of files known not to be malware or a set of identifiers of files known to be malware to include the first identifier, based on the indication of whether the first file is malware.

14. The method of claim 13, further comprising:
accessing by the second host the further malware analysis of the analysis console; and
adding by the second host the first identifier to either a set of identifiers of files known not to be malware or a set of identifiers of files known to be malware, based on the indication received at the second host of whether the second file is malware.

15. The method of claim 13, further comprising:
applying by the first host a set of malware detection processes to a second file;
determining by the first host that the second file should be analyzed for malware in response to a result of applying by the first host of the set of malware detection processes to the second file;
generating by the first host a second identifier of the second file in response to the result of applying by the first host of the set of malware detection processes to the second file;
determining by the first host whether the second identifier is in either the set of identifiers of files known not to be malware or the set of identifiers known to be malware; and
if the second identifier is not in the set of identifiers of files known not to be malware and the second identifier is not in the set of identifiers of files known to be malware:
sending information related to the second file to the analysis console to be analyzed for malware;
accessing by the first host a second output of the analysis console, the second output comprising a conclusive indication of whether the second file is known to be malware; and
adding by the first host the second identifier to either the set of identifiers of files known not to be malware or the set of identifiers of files known to be malware to include the first identifier, based on the indication of whether the second file is malware.

16. The method of claim 15, further comprising determining that the second file is known not to be malware based on a determination that the second identifier is in the set of identifiers of files known not to be malware, the second identifier being equivalent to the first identifier.

17. The method of claim 15, further comprising determining that the second file is known to be malware based on a determination that the second identifier is in the set of identifiers of files known to be malware, the second identifier being equivalent to the first identifier.

18. The method of claim 15, further comprising:
accessing by the first host a request for the content of the second file; and
in response to the request, sending the content of the second file;
wherein the indication of whether the second file is malware is based in part on an analysis of the content of the second file for malware.

19. The method of claim 13, wherein receiving, from the analysis console, the further malware analysis includes receiving an indication of whether the first file is malware is received through a network, the analysis console being remote from the first host.

20. The method of claim 15, wherein the second identifier of the second file comprises a hash of at least a portion of the first file.

21. The method of claim 15, wherein the information related to the second file comprises one or more of:
a name of the second file;
content of the second file; and
metadata of the second file.

22. The method of claim 15, wherein the set of malware detection processes applied to the second file by the first host comprises detecting whether the second file has entered the first host through a network connection.

23. The method of claim 15, wherein the set of malware detection processes applied to the second file by the first host comprises detecting that the second file has entered the first host through a removable, computer-readable, storage medium.

24. A multi-node malware analysis system comprising:
a network including a plurality of hosts;
an analysis console node coupled to the network, the analysis console being separate from the plurality of hosts; and
a first detection node in the plurality of hosts having a processor configured to perform a first-stage analysis of a first file, the first-stage analysis including:
generating an identifier usable to determine whether a second file comprises content substantially equivalent to content of the first file;
performing a first set of malware detection processes on the first file, a first result from the performing being inconclusive as to whether the first file contains malware; and
providing a time limit for completing a further malware analysis and the first result of the first set of malware detection processes on the first file to the analysis console, the first result including a reason indicating why the first file is suspected of containing malware;
wherein the analysis console is configured to: access the first result and perform a further second-stage malware analysis of the first file based at least in part on the first result, generate a first output including the identifier of the first file and a second result indicating conclusively whether the first file comprises malware based on the further malware analysis within the time limit, and propagate the first output to the plurality of hosts.

25. The multi-node malware analysis system of claim 24, further comprising:
a second detection node in the plurality of hosts including:
an ingest block configured to accesses a second file and determine that one or more tests that should be performed on the file in order to determine whether the file is suspected malware;
a detection block configured to perform a test on the second file in response to the ingest block determining that the second file is suspected malware, and generate a result of the test; and
a disposition block configured to send the second file to the analysis console in response to the result of the test to determine indicating that a second stage analysis of the second file is desired.

26. The multi-node malware analysis system of claim 25, wherein the test on the second file performed by the detection block includes the detection block performing
a behavior-based malware detection scheme,
a metadata-based malware detection scheme,
a signature-based malware detection scheme, and
a classification-based malware detection scheme.

* * * * *